United States Patent

Ohwa et al.

[11] 3,867,608
[45] Feb. 18, 1975

[54] SUBMERGED ARC WELDING PROCESS FOR VERY LOW-TEMPERATURE STEEL AND WELDED PRODUCT

[75] Inventors: Toshio Ohwa, Kamakura; Kosaku Taketomi; Osamu Tanaka, both of Fujisawa; Bunshiro Sakai, Fukuyama; Tadaaki Taira, Fukuyama; Kiyoteru Hirabayashi, Fukuyama, all of Japan

[73] Assignees: Kobe Steel Ltd.; Nippon Kokan Kabushiki Kaisha, both of Tokyo, Japan

[22] Filed: Sept. 20, 1973

[21] Appl. No.: 399,280

[30] Foreign Application Priority Data
Sept. 29, 1972 Japan .............................. 47-97208

[52] U.S. Cl. ................................... 219/73, 219/126
[51] Int. Cl. ............................................. B23k 9/18
[58] Field of Search ................................. 219/73, 126

[56] References Cited
UNITED STATES PATENTS

| | | |
|---|---|---|
| 3,340,106 | 9/1967 | Ballass et al. ..................... 219/73 X |
| 3,493,712 | 2/1970 | Nakamura ........................... 219/73 |
| 3,496,322 | 2/1970 | Gonzalez ............................. 219/73 |
| 3,692,590 | 9/1972 | Tomokazu Godai et al. ..... 219/73 X |
| 3,745,294 | 7/1973 | Arikawa et al. ...................... 219/73 |
| 3,745,322 | 7/1973 | Ito et al. ........................ 219/126 X |

Primary Examiner—J. V. Truhe
Assistant Examiner—N. D. Herkamp
Attorney, Agent, or Firm—Flynn & Frishauf

[57] ABSTRACT

A submerged arc welding process forming a welded steel joint consisting of said steel pieces joined by weld metal having superior impact resistance at low temperatures, said weld metal consisting essentially of up to 0.1% carbon, less than 0.4% silicon, between 1.2% and 1.7% manganese, between 0.08% and 0.5% molybdenum, between 0.02% and 0.05% titanium, between 0.0012% and 0.004% boron, up to 4% nickel, and less than 0.045% oxygen. The process utilizes specified low-temperature steel base metal which is to be welded; specified welding electrodes; and a flux.

11 Claims, 5 Drawing Figures

OXYGEON CONTENTS IN WELD METALS AND WELD METAL CHARPY IMPACT VALVES

TEST TEMPERATURE, -60°C

BASICITY OF WELDING FLUX AND OXYGEON CONTENTS IN WELD METALS

○ WELDING WIRE W-12
△ WELDING WIRE W-15

SUBMERGED ARC WELDING PROCESS FOR VERY LOW-TEMPERATURE STEEL AND WELDED PRODUCT

The present invention relates to a submerged arc welding process for very low-temperature steel, and more particularly the present invention relates to a combination of the composition of very low-temperature steel having an excellent weldability, the composition of welding electrodes used for welding the steel, and welding flux, which results in the production of weld metal and welded steel structures have improved toughness, particularly at very low temperatures.

It is well known that in the welding of very low-temperature steel, a high notch toughness is required for the weld metal to avoid brittle fracture.

Although submerged arc welding has various advantages, a drawback of this process is that the notch toughness of the weld metal is not entirely satisfactory and considerable effort has been made to overcome this deficiency. The efforts to improve the notch toughness of the weld metal produced by the submerged arc welding process have been mainly confined to improvements relating to the welding materials and the welding methods, such as the use of welding fluxes having a high basicity, the addition of alloying elements such as nickel, molybdenum, titanium, etc., to the weld metal, or the use of multilayer welding at the sacrifice of welding efficiency.

Pipe used in the newly developed arctic oil fields requires satisfactory Charpy impact values at lower temperatures than those previously contemplated. A Charpy impact value of a few times the rated value is required at a temperature of for example as low as −60° C. It is recognized that it is almost impossible to obtain weld metal that retains a high notch toughness at such a low temperature using the presently available commercial very low-temperature steels and welding materials.

It is an object of the present invention to provide a submerged arc welding process for very low-temperature steels which provides weld metal having a greatly improved notch toughness at very low temperatures.

The present invention provides a submerged arc welding process for welding low-temperature steel comprising submerged arc welding adjoining steel pieces, said steel consisting essentially of up to 0.15% carbon, less than 0.4% silicon, between 1% and 2% manganese, at least one element selected from the group consisting of nickel in an amount of from 1% to 4%, molybdenum in an amount from 0.05% to 0.3%, and niobium in an amount of from 0.01% to 0.1%, and the balance being essentially iron, with a welding electrode consisting essentially of up to 0.1% carbon, less than 0.4% silicon, between 1.4% and 2.5% manganese, between 0.2% and 0.5% titanium, between 0.006% and 0.020% boron, at least one element selected from the group consisting of nickel iin an amount from 0.5% to 2.5% and molybdenum in an amount of from 0.15% to 1%, and the balance being essentially iron, at least one of the said steel and said electrode contains molybdenum, in the presence of a flux, to form a welded steel joint consisting of said steel pieces joined by weld metal having superior impact resistance at low temperatures, said weld metal consisting essentially of up to 0.1% carbon, less than 0.4% silicon, between 1.2% and 1.7% manganese, between 0.08% and 0.5% molybdenum, between 0.02% and 0.05% titanium, between 0.0012% and 0.004% boron, up to 4% (0–4%) nickel, and less than 0.045% oxygen.

The invention further provides said welded steel joint.

The present invention also provides weld metal of the composition: up to 0.1% carbon, 1.2 to 1.7% manganese, less than 0.4% silicon, 0.08 to 0.5% molybdenum, 0.02 to 0.05% titanium, 0.0012 to 0.004% boron, up to 4% (0–4%) nickel and less than 0.045% oxygen. The weld metal has a fine bainite structure, as illustrated in FIG. 1 and excellent notch toughness at low temperatures. The inclusion of up to 4% (0–4%) nickel to said weld metal also resulted in a satisfactory notch toughness.

A more preferable composition of the weld metal is up to 0.1% carbon, 1.3 to 1.6% manganese, 0.2 to 0.3% silicon, 0.1 to 0.4% molybdenum, 0.02 to 0.03% tianium, 0.0014 to 0.0034% boron, 0.7 to 2.2% nickel and less than 0.04% oxygen, it being preferable not to contain niobium.

The submerged arc welding process according to the present invention utilizes the combination of very low-temperature steel base metal to be welded containing less than 0.15% carbon, 1 to 2% manganese, less than 0.4% silicon, at least any one of 1 to 4% nickel, 0.05 to 0.3% molybdenum and 0.01 to 0.1% niobium, and the balance being iron and unavoidable impurities, and welding steel electrodes containing less than 0.1% carbon, 1.4 to 2.5% manganese, less than 0.4% silicon, 0.2 to 0.5% titanium, 0.006 to 0.02% boron, at least one of 0.5 to 2.5% nickel and 0.15 to 1% molybdenum and the balance being iron and unavoidable impurities.

The process requires that at least either (a) the welding steel electrode or (b) the very low-temperature steels contain said Mo, thereby producing weld metal having a high notch toughness. The process utilizes fluxes whose basicity is greater than 0.9 and which are described herein as fused non-oxygen fluxes containing less than 8% $SiO_2$ and MnO in total and more than 45% of fluoride.

With the submerged arc welding process of this invention which employs the specified very low-temperature steels and the welding materials, the weld metal obtained contains suitable amounts of Mn, Mo. Ti and B and therefore its notch toughness is considerably improved when compared with that of the weld metal produced using the steels or the welding materials having compositions outside the composition limits and range of this invention.

The drawings are briefly described as follows.

Figure 1:
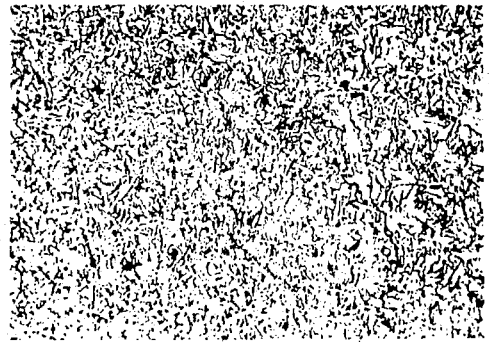
FIGS. 1 and 3 are microphotographs (magnification: 400X) showing the structure of the weld metal obtained according to the submerged arc welding process of the present invention.

If presently commercially available very low-temperature steel such as a 2.5% nickel steel or 3.5% nickel steel is the base metal that is to be welded by the submerged arc welding process to obtain weld metal having a chemical composition falling in the aforedescribed range by a welding process imvolving a high rate of dilution of the weld metal being deposited, by the base metal, as regards the manganese content, for example, a welding wire (steel electrode) containing about 3% Mn must be used since the manganese content of the steel base plates is between about 0.5 and 0.9%. However, the manufacture of such a high manganese content welding wire is difficult and therefore it is not possible to obtain the desired weld metal in this manner. Since the maximum manganese content in a usable welding wire is 2.5%, the manganese content in the weld-metal obtained using such a welding wire is at most 1.2%. The manganese content in the weld metal is dependent not only on the welding materials, but also the amount of manganese contained in the very low-temperature steel being welded. The present invention provides weld metal possessing high notch toughness utilizing combinations of very low-temperature steel and welding materials.

The following illustrative examples describe in greater detail the production of the improved weld metal in accordance with the present invention.

EXAMPLE 1

Steel plates 20 mm thick were formed with a 90° double Vee groove on the sides thereof and were subjected to a both-side single layer finish submerged arc welding by a double electrode welding process with the following welding conditions:

| First pass | preceding electrode | 860A-35V |
| | succeeding electrode | 700A-38V |
| | welding speed | 80 cm/min |
| Second pass: | preceding electrode | 900A-30V |
| | succeeding electrode | 700A-38V |
| | welding speed | 85 cm/min |

The welding wires used were all 4 mm in diameter and chemical composition in percent is disclosed in Table 1.

The chemical composition of the welding flux is listed in Table 2.

The chemical composition in percent of the steel plates is listed in Table 3.

The notch toughness and the chemical composition of the weld metals obtained is listed in Table 4.

TABLE 1

| WIRE | C | Mn | Si | P | S | Ni | Mo. | Ti | B |
|---|---|---|---|---|---|---|---|---|---|
| W - 1 | 0.08 | 1.70 | 0.09 | 0.010 | 0.012 | 2.44 | 0.52 | — | — |
| W - 2 | 0.08 | 1.56 | 0.16 | 0.009 | 0.012 | 0.83 | 0.48 | 0.12 | — |
| W - 3 | 0.05 | 1.26 | 0.17 | 0.009 | 0.013 | 1.55 | 0.46 | 0.24 | — |
| W - 4 | 0.06 | 2.25 | 0.17 | 0.009 | 0.010 | 0.52 | 0.50 | — | 0.016 |
| W - 5 | 0.05 | 1.87 | 0.19 | 0.008 | 0.014 | 1.26 | — | 0.42 | — |
| W - 6 | 0.05 | 1.43 | 0.16 | 0.009 | 0.012 | 1.48 | 0.52 | 0.21 | 0.011 |
| W - 7 | 0.06 | 1.97 | 0.29 | 0.007 | 0.012 | 1.03 | 0.52 | 0.28 | 0.0095 |
| W - 8 | 0.07 | 1.66 | 0.25 | 0.010 | 0.012 | 2.28 | 0.17 | 0.30 | 0.010 |
| W - 9 | 0.05 | 1.88 | 0.37 | 0.008 | 0.012 | — | 0.25 | 0.24 | 0.009 |
| W - 10 | 0.05 | 2.19 | 0.20 | 0.008 | 0.011 | 1.49 | 0.52 | 0.21 | 0.010 |
| W - 11 | 0.05 | 2.07 | 0.28 | 0.008 | 0.012 | — | 0.98 | 0.28 | 0.010 |
| W - 12 | 0.05 | 2.11 | 0.27 | 0.010 | 0.009 | — | 0.47 | 0.29 | 0.0096 |
| W - 13 | 0.05 | 2.46 | 0.29 | 0.008 | 0.011 | — | 0.50 | 0.30 | 0.013 |
| W - 14 | 0.08 | 1.59 | 0.12 | 0.011 | 0.011 | — | 0.77 | 0.25 | 0.018 |
| W - 15 | 0.05 | 2.21 | 0.26 | 0.010 | 0.012 | — | 0.51 | 0.29 | 0.006 |
| W - 16 | 0.06 | 1.62 | 0.22 | 0.011 | 0.013 | 2.50 | 0.41 | 0.36 | 0.008 |
| W - 17 | 0.08 | 2.04 | 0.25 | 0.009 | 0.010 | 1.77 | — | 0.28 | 0.011 |

The remainder of each wire is iron and incidental impurities.

TABLE 2

FLUX (F-1) COMPOSITION

| Component | % |
|---|---|
| CaO | 27.5 |
| MgO | 17.9 |
| SiO$_2$ | 35.3 |
| Al$_2$O$_3$ | 14.9 |
| MnO | 4.2 |

The flux (F-1) had a basicity of 1.31. The basicity is calculated according to the following formula:

$$\text{Basicity} = \begin{array}{l} 0.108 \text{ CaO}(\%) +0.068 \text{ MnO}(\%)+0.100 \text{ MgO}(\%) \\ -0.105 \text{ SiO}_2(\%) \quad -0.002 \text{ Al}_2\text{O}_3(\%) \\ -0.061 \text{ TiO}_2(\%) \quad +0.056 \text{ CaF}_2(\%). \end{array}$$

TABLE 3

| Steel | C | Mn | Si | P | S | Ni | Mo | Nb |
|---|---|---|---|---|---|---|---|---|
| P - 1 | 0.08 | 0.64 | 0.29 | 0.006 | 0.011 | 3.44 | — | — |
| P - 2 | 0.09 | 1.26 | 0.22 | 0.010 | 0.010 | 2.32 | — | — |
| P - 3 | 0.06 | 1.54 | 0.29 | 0.008 | 0.009 | 1.65 | 0.09 | — |
| P - 4 | 0.06 | 1.71 | 0.25 | 0.010 | 0.012 | 1.26 | 0.17 | — |
| P - 5 | 0.07 | 1.31 | 0.23 | 0.005 | 0.008 | 3.58 | — | — |
| P - 6 | 0.13 | 1.46 | 0.24 | 0.008 | 0.008 | 1.33 | — | — |
| P - 7 | 0.12 | 1.42 | 0.33 | 0.011 | 0.013 | — | 0.19 | — |
| P - 8 | 0.10 | 1.29 | 0.17 | 0.009 | 0.012 | 1.35 | — | 0.04 |

TABLE 4

| STEEL PLATE | WIRE | CHARPY IMPACT VALUE (kg. m) at −60°C | C | CHEMICAL COMPOSITION (%) |  |  |  |  |  |  |
|---|---|---|---|---|---|---|---|---|---|---|
| | | | | Mn | Si | Ni | Mo | Ti | B | Nb |
| P − 1 | W − 1 | 1.73 | 0.07 | 0.86 | 0.21 | 2.94 | 0.21 | — | — | |
| do. | W − 3 | 2.68 | 0.06 | 0.67 | 0.24 | 2.75 | 0.23 | 0.022 | — | |
| do. | W − 4 | 2.47 | 0.07 | 0.95 | 0.24 | 2.19 | 0.21 | — | 0.0030 | |
| do. | W − 10 | 5.53 | 0.06 | 1.02 | 0.27 | 2.69 | 0.22 | 0.022 | 0.0022 | |
| do. | W − 13 | 4.44 | 0.06 | 1.09 | 0.26 | 2.12 | 0.24 | 0.024 | 0.0031 | |
| P − 2 | W − 1 | 218 | 0.07 | 1.15 | 0.22 | 2.18 | 0.19 | — | — | |
| do. | W − 3 | 2.87 | 0.07 | 1.02 | 0.20 | 1.89 | 0.20 | 0.024 | — | |
| do. | W − 4 | 3.35 | 0.06 | 1.31 | 0.24 | 1.42 | 0.22 | — | 0.0033 | |
| do. | W − 10 | 10.14 | 0.06 | 1.30 | 0.24 | 1.95 | 0.20 | 0.020 | 0.0023 | |
| do. | W − 11 | 12.37 | 0.06 | 1.34 | 0.26 | 1.33 | 0.34 | 0.029 | 0.0020 | |
| do. | W − 13 | 11.96 | 0.07 | 1.39 | 0.25 | 1.40 | 0.23 | 0.024 | 0.0024 | |
| do. | W − 17 | 5.88 | 0.06 | 1.35 | 0.20 | 2.04 | — | 0.030 | 0.0020 | |
| P − 3 | W − 1 | 2.47 | 0.07 | 1.32 | 0.22 | 1.84 | 0.27 | — | — | |
| do. | W − 2 | 2.98 | 0.06 | 1.32 | 0.24 | 1.21 | 0.26 | 0.009 | — | |
| do. | W − 3 | 3.45 | 0.06 | 1.25 | 0.24 | 1.55 | 0.26 | 0.025 | — | |
| do. | W − 4 | 3.77 | 0.06 | 1.41 | 0.25 | 1.08 | 0.25 | — | 0.003 | |
| do. | W − 5 | 4.03 | 0.06 | 1.34 | 0.22 | 1.49 | 0.05 | 0.046 | — | |
| do. | W − 6 | 7.96 | 0.06 | 1.22 | 0.24 | 1.50 | 0.29 | 0.021 | 0.0023 | |
| do. | W − 8 | 11.32 | 0.07 | 1.36 | 0.26 | 1.72 | 0.12 | 0.028 | 0.0020 | |
| do. | W − 9 | 13.65 | 0.05 | 1.39 | 0.29 | 0.99 | 0.17 | 0.022 | 0.0020 | |
| do. | W − 10 | 16.06 | 0.06 | 1.48 | 0.24 | 1.57 | 0.29 | 0.023 | 0.0022 | |
| do. | W − 11 | 14.77 | 0.06 | 1.44 | 0.26 | 0.87 | 0.40 | 0.031 | 0.0020 | |
| do. | W − 12 | 18.45 | 0.06 | 1.41 | 0.21 | 0.94 | 0.27 | 0.025 | 0.0017 | |
| do. | W − 15 | 13.78 | 0.07 | 15.2 | 0.23 | 0.92 | 0.27 | 0.030 | 0.0014 | |
| P − 4 | W − 1 | 2.59 | 0.08 | 1.45 | 0.21 | 1.71 | 0.33 | — | — | |
| do. | W − 3 | 3.81 | 0.07 | 1.38 | 0.22 | 1.38 | 0.29 | 0.022 | — | |
| do. | W − 4 | 3.46 | 0.06 | 1.64 | 0.24 | 0.94 | 0.31 | — | 0.0029 | |
| do. | W − 6 | 8.94 | 0.06 | 1.36 | 0.21 | 1.33 | 0.30 | 0.020 | 0.0020 | |
| do. | W − 7 | 14.85 | 0.06 | 1.50 | 0.23 | 1.20 | 0.30 | 0.023 | 0.0020 | |
| do. | W − 8 | 11.32 | 0.06 | 1.46 | 0.21 | 1.67 | 0.15 | 0.028 | 0.0022 | |
| do. | W − 10 | 14.56 | 0.05 | 1.63 | 0.27 | 1.29 | 0.27 | 0.023 | 0.0023 | |
| do. | W − 11 | 13.96 | 0.07 | 1.58 | 0.25 | 0.73 | 0.48 | 0.026 | 0.0020 | |
| do. | W − 12 | 16.49 | 0.07 | 1.66 | 0.25 | 0.78 | 0.29 | 0.030 | 0.0020 | |
| do. | W − 14 | 13.87 | 0.06 | 1.45 | 0.24 | 0.71 | 0.41 | 0.026 | 0.0034 | |
| do. | W − 17 | 10.69 | 0.07 | 1.58 | 0.26 | 1.51 | 0.10 | 0.025 | 0.0020 | |
| P − 5 | W − 7 | 7.91 | 0.06 | 1.33 | 0.24 | 2.74 | 0.22 | 0.026 | 0.0021 | |
| do. | W − 10 | 8.73 | 0.06 | 1.38 | 0.22 | 2.87 | 0.20 | 0.020 | 0.0019 | |

TABLE 4 — Continued

| STEEL PLATE | WIRE | CHARPY IMPACT VALUE (kg. m) at −60°C | CHEMICAL COMPOSITION (%) | | | | | | |
|---|---|---|---|---|---|---|---|---|---|
| | | | C | Mn | Si | Ni | Mo | Ti | B | Nb |
| do. | W-11 | 12.73 | 0.06 | 1.35 | 0.25 | 2.07 | 0.34 | 0.027 | 0.0022 | |
| do. | W-12 | 11.38 | 0.05 | 1.42 | 0.25 | 2.15 | 0.21 | 0.027 | 0.0024 | |
| do. | W-13 | 9.52 | 0.07 | 1.47 | 0.22 | 2.21 | 0.23 | 0.033 | 0.0024 | |
| P-6 | W-7 | 9.91 | 0.09 | 1.44 | 0.30 | 1.34 | 0.19 | 0.026 | 0.0020 | |
| do. | W-10 | 10.05 | 0.10 | 1.43 | 0.26 | 1.45 | 0.22 | 0.024 | 0.0020 | |
| do. | W-13 | 10.12 | 0.08 | 1.50 | 0.25 | 0.77 | 0.21 | 0.027 | 0.0022 | |
| do. | W-16 | 8.33 | 0.09 | 1.33 | 0.24 | 1.98 | 0.21 | 0.033 | 0.0018 | |
| do. | W-17 | 5.70 | 0.09 | 1.44 | 0.25 | 1.51 | — | 0.031 | 0.019 | |
| P-7 | W-5 | 4.85 | 0.09 | 1.33 | 0.26 | 0.41 | 0.11 | 0.050 | — | |
| do. | W-10 | 13.57 | 0.09 | 1.37 | 0.29 | 0.56 | 0.28 | 0.024 | 0.0018 | |
| do. | W-12 | 9.23 | 0.07 | 1.36 | 0.25 | — | 0.27 | 0.026 | 0.0021 | |
| do. | W-17 | 9.79 | 0.09 | 1.36 | 0.27 | 0.68 | 0.09 | 0.027 | 0.0022 | |
| P-8 | W-7 | 7.28 | 0.08 | 1.24 | 0.23 | 1.07 | 0.19 | 0.025 | 0.0020 | 0.03 |
| do. | W-11 | 10.71 | 0.07 | 1.33 | 0.21 | 0.69 | 0.38 | 0.029 | 0.0023 | 0.02 |
| do. | W-13 | 9.16 | 0.07 | 1.40 | 0.25 | 0.73 | 0.22 | 0.029 | 0.0022 | 0.03 |

Balance iron and incidental impurities.

As will be seen from Table 4, the Charpy impact values of the weld metals obtained using welding wires which do not contain B or Ti or both (i.e., W-1 to W-5) is 5 Kg.m (at −60° C) at the greatest and is thus unfavorable. On the other hand, the weld metals containing 1.2 to 1.7% Mn, 0.02 to 0.05% Ti and 0.0012 to 0.004% B have superior Charpy impact values. The combinations of the steel plates (P-2 to P-8) containing less than 0.15% C, 1 to 2% Mn, less than 0.4% Si, and at least any one of 1 to 4% Ni, 0.05 to 0.3% Mo and 0.01 to 0.1% Nb and the electrodes (welding wires) (W-6 to W-17) containing less than 0.1% C, 1.4 to 2.5% Mn, less than 0.4% Si, 0.2 to 0.5% Ti, 0.006 to 0.02% B, and at least either one of 0.5 to 2.5% Ni or 0.15 to 1% Mo result in high Charpy impact values and particularly when either the steel plates or welding wires which contain nickel in the specified range, produce resultant weld metals having very superior Charpy impact values.

Regarding the specified flux used in the present invention and having the basicity of greater than 0.9, in addition to those including as its constituents CaO, MgO, $SiO_2$, $Al_2O_3$ and MnO as shown in Table 2, fluxes composed of other constituents may, of course, be used in the present invention and such fluxes may contain other metal oxides and fluorides such as $TiO_2$ and $CaF_2$. What is essential with oxide fluxes is the fact that the basicity calculated according to the above-mentioned formula in terms of CaO, MnO, MgO, $SiO_2$, $Al_2O_3$, $TiO_2$ and $CaF_2$ is over 0.9.

EXAMPLE 2

Steel plates 16.5 mm thick were formed with a 90° double Vee groove on the sides thereof and they were subjected to a both-side single layer finish submerged arc welding by a double electrode welding process, with the following welding conditions:

| First pass: | preceding electrode | 920A–36V |
| | succeeding electrode | 650A–40V |
| | welding speed | 100 cm/min |
| Second pass: | preceding electrode | 920A–37V |
| | succeeding electrode | 650A–42V |
| | welding speed | 100 cm/min |

The diameter of the welding wires was 4 mm. The chemical composition of these wires is listed in Table 5. The chemical composition of the non-oxygen fluxes used in this Example is listed in Table 6. Table 7 lists the chemical composition of the steel plates used. Table 8 lists the notch toughness and the chemical composition of the resultant weld metals.

Figure 5:
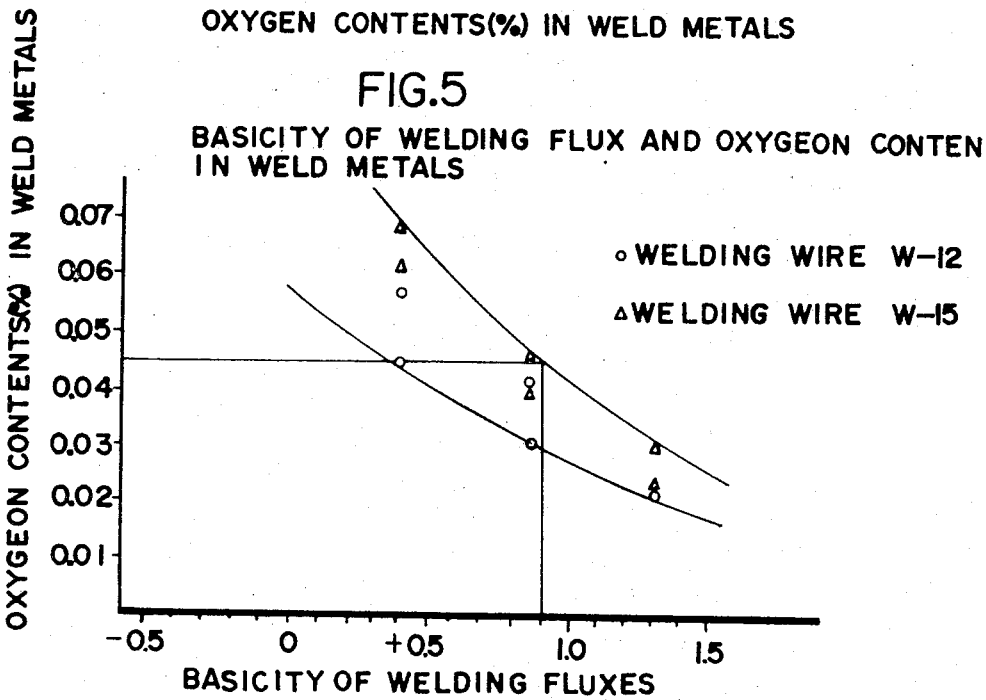
FIG. 5 is a graph showing the relationship between the basicity of the welding fluxes and the amounts of oxygen in the weld metals.

Although the conventional fluxes having high metal oxide content, e.g., MnO and $SiO_2$, such as those used in Example 1, require a basicity greater than 0.9, as shown in FIG. 5 so that the oxygen content in the weld metal is reduced to less than 0.045% (as discussed hereinbefore), it is not necessary to definitely limit the minimum basicity for the fluxes used in this example. Thus, when the fused fluxes are used which contain, as shown in Table 6, a total of less than 8% MnO plus $SiO_2$, and more than 45% fluoride, the oxygen content in the resultant weld metal is reduced. Such fused fluxes containing less than 8% Mno plus SiO₂ and more than 45% fluoride as referred to herein as "non-oxygen fluxes."

TABLE 5

| WIRE | W-1 | W-18 | W-19 | W-20 |
|---|---|---|---|---|
| C | 0.08 | 0.06 | 0.05 | 0.06 |
| Mn | 1.70 | 1.91 | 1.82 | 2.20 |
| Si | 0.09 | 0.24 | 0.22 | 0.24 |
| P | 0.010 | 0.009 | 0.009 | 0.009 |
| S | 0.012 | 0.010 | 0.012 | 0.011 |
| Ni | 2.44 | 1.45 | 1.32 | — |
| Mo | 0.52 | 0.52 | 0.36 | 0.54 |
| Ti | — | 0.34 | 0.23 | 0.23 |
| B | — | — | 0.009 | 0.010 |

*Fe BALANCE

TABLE 6

| FLUX | F - 2 | F - 3 |
|---|---|---|
| LiF | 18.2 | — |
| NaF | — | 25.6 |
| CaF₂ | 28.5 | 24.9 |
| Al₂O₃ | 20.6 | 16.2 |
| MgO | 9.6 | 5.1 |
| CaO | 17.0 | 26.3 |
| SiO₂ | 6.1 | 1.9 |

TABLE 7

| STEEL PLATE | P - 9 | P - 10 |
|---|---|---|
| C | 0.07 | 0.07 |
| Mn | 1.46 | 1.51 |
| Si | 0.27 | 0.19 |
| P | 0.005 | 0.008 |
| S | 0.009 | 0.011 |
| Ni | 2.47 | 1.35 |
| Mo | — | 0.14 |
| Fe | BALANCE | | structure of the weld metal. Weld metal containing over 1.2% Mn has a satisfactory hardenability and moreover, coupled with the grain refining action of Ti and B which will be described later, this manganese content has the effect of providing a very fine structure and a high notch toughness. It has also been confirmed that increased manganese content results in the saturation of the quench hardening and especially when the manganese content exceeds 1.7%, the weld metal is excessively hardened with resultant decrease in the toughness.

As noted hereinbefore, the manganese content in the welding wires is limited to less than 2.5% from the manufacturing point of view. Therefore, in order to ensure manganese content of at least 1.2% in the weld metal, the manganese content in the very low-temperature steel must be over 1%. Because of the effects of manganese on the temper brittleness, it is difficult to substantially increase the manganese content of the steel plate and therefore the upper limit of the manganese content is preferably about 2%.

While the manganese content of the very low-temperature steel is thus specified in the range of 1 to 2%, the similar calculation of the yield determines that the manganese contents in the welding wires should be over about 1.4%. Consequently, while the range of the manganese content in the very low-temperature steel is from 1 to 2%, the manganese content in the welding wires is in the range 1.4 to 2.5%. Thus, through suitable combinations of such very low-temperature steel and welding wire, the resultant weld metal will have a manganese content in the range 1.2 to 1.7%.

As a result of the coexistence of titanium and boron in the weld metal, titanium serves to convert nitrogen into a stable, fixed nitride and protect boron with the result that the hardenability effect of the boron is improved and the precipitation of the pro-eutectoid ferrite into the austenite grain boundaries is controlled to refine the structure. The addition of only titanium or boron does not have much effect. (See Table 4.)

TABLE 8

| STEEL PLATE | WIRE USED | FLUX USED | CHARPY IMPACT VALUE (kg.m) at -60°C | CHEMICAL COMPOSITION(%) | | | | | | | |
|---|---|---|---|---|---|---|---|---|---|---|---|
| | | | | C | Mn | Si | Ni | Mo | Ti | B | O |
| P - 9 | W - 1 | F - 2 | 1.35 | 0.08 | 1.22 | 0.11 | 2.29 | 0.21 | — | — | 0.036 |
| do. | W - 17 | F - 2 | 4.57 | 0.07 | 1.34 | 0.16 | 2.11 | — | 0.025 | 0.0020 | 0.032 |
| do. | W - 18 | F - 2 | 3.09 | 0.08 | 1.31 | 0.14 | 1.87 | 0.17 | 0.023 | — | 0.030 |
| do. | W - 19 | F - 2 | 8.16 | 0.08 | 1.29 | 0.15 | 1.85 | 0.13 | 0.020 | 0.0015 | 0.028 |
| do. | W - 19 | F - 3 | 7.50 | 0.08 | 1.34 | 0.19 | 2.02 | 0.15 | 0.023 | 0.0019 | 0.030 |
| do. | W - 20 | F - 3 | 9.11 | 0.07 | 1.41 | 0.18 | 1.38 | 0.18 | 0.020 | 0.0018 | 0.031 |
| P - 10 | W - 1 | F - 2 | 1.28 | 0.07 | 1.19 | 0.13 | 1.95 | 0.25 | — | — | 0.033 |
| do. | W - 1 | F - 3 | 1.85 | 0.06 | 1.21 | 0.16 | 1.98 | 0.24 | — | — | 0.035 |
| do. | W - 19 | F - 2 | 7.63 | 0.06 | 1.37 | 0.16 | 1.33 | 0.18 | 0.020 | 0.0016 | 0.033 |
| do. | W - 19 | F - 3 | 8.04 | 0.06 | 1.40 | 0.18 | 1.39 | 0.21 | 0.021 | 0.0015 | 0.030 |
| do. | W - 20 | F - 2 | 9.47 | 0.06 | 1.39 | 0.17 | 0.89 | 0.27 | 0.022 | 0.0019 | 0.030 |
| do. | W - 20 | F - 3 | 7.98 | 0.06 | 1.35 | 0.17 | 0.79 | 0.25 | 0.019 | 0.0015 | 0.029 |

Balance iron and incidental impurities.

Table 8 established that the weld metal, obtained using the non-oxygen fluxes, and containing 1.2 to 1.7% Mn, 0.08 to 0.5% Mo, 0.02 to 0.05% Ti and 0.0012 to 0.004% B, have superior Charpy impact values.

The effects of the individual constituents follow:

Manganese acts to improve the hardenability of the weld metal and to control the precipitation of the pro-eutectoid ferrite to the minimum thus refining the When the amount of titanium and boron coexisting in the weld metals deviates from the specified ranges of 0.02 to 0.05% for titanium and 0.0012 to 0.004% for boron, a titanium content of less than 0.02% is ineffective to perform the required boron protecting function and a titanium content of over 0.05% results in a markedly increased hardening; a boron content of less than 0.0012% results in an unsatisfactory hardenability, and a boron content of over 0.004% exhibits a marked increase in the hardening, as is also the case with titanium, thus giving rise to the danger of cracking.

Titanium has a strong affinity for oxygen and it is therefore necessary to reduce the oxygen content in the weld metal to ensure an effective boron protective function by titanium. As a rsult, the welding flux used must have a high basicity or alternately a non-oxygen flux such as those described herein must be used.

Figure 4:
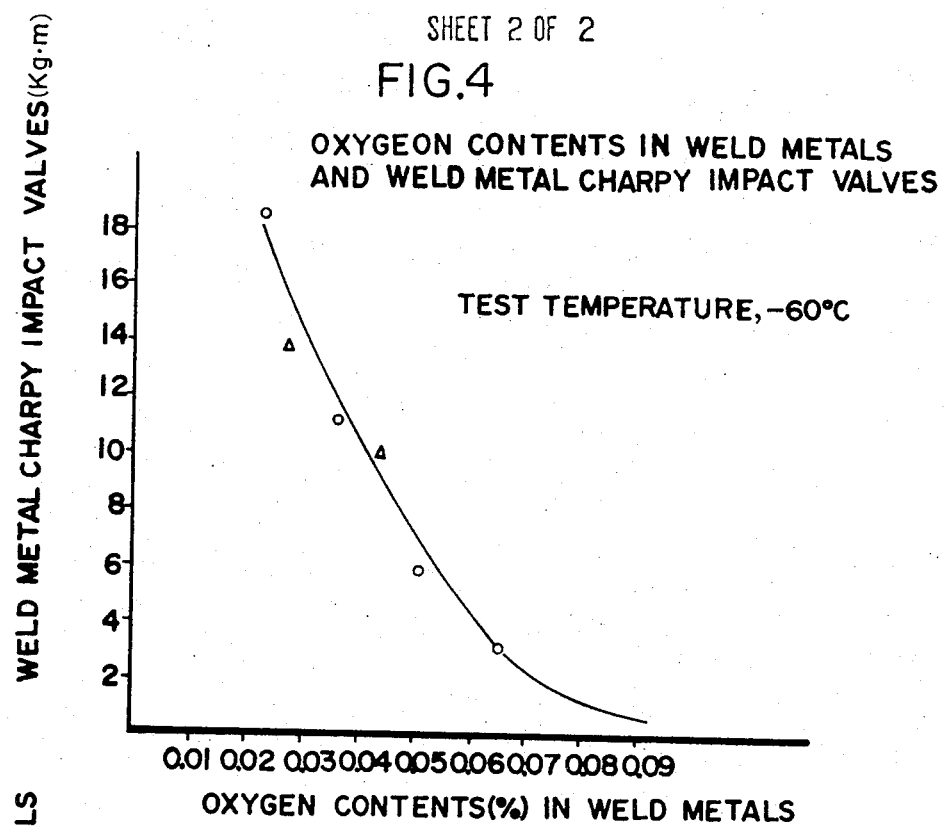
FIG. 4 is a graph showing the relationship between the amounts of oxygen in the weld metals and the Charpy impact values.

FIG. 4 discloses the relationship between the oxygen content and the Charpy impact value of the weld metal obtained using the titanium-boron containing welding wires. The data depicted on FIG. 4 establish that oxygen contents of less than 0.045% in the weld metal provide an improved notch toughness.

FIG. 5 discloses the relationship between the basicity of the welding flux and the oxygen content in the weld metal. It is apparent, there thre are some variations, that the use of welding fluxes whose basicity is greater than 0.9, reduces the oxygen content to less than 0.045%.

When the welding fluxes whose basicity is greater than 0.9 are to be used, assuming that the yields of titanium and boron in the addition of these elements from the welding wire to the weld metal is about 10% and about 20%, respectively, the welding wire must contain between 0.2 to 0.5% Ti and between 0.006 and 0.02% B so that the weld metal will contain between 0.02 to 0.05% Ti and between 0.0012 and 0.004% B.

In this case, however, if the very low-temperature steel (base metal), i.e., the metal plates that are to be welded contain titanium and boron, the titanium and boron content in the welding wire may be decreased in accordance with the amounts of titanium and boron contained in the base metals. While, in the examples of the present invention so far described, these elements are primarily added from the welding wire to ensure titanium content of 0.02 to 0.05% and boron contents of 0.0012 to 0.004% in the weld metal, the addition of titanium and boron from the base metal or from both the base metal and the welding wire also falls within the scope of the present invention.

Molybdenum is an effective element for improving the notch toughness of the weld metal. Molybdenum contents of from 0.08 to 0.5% provide superior notch toughness. A molybdenum content of 0.5% or higher, coupled with the hardenability of manganese and boron, considerably hardens the weld metal and impairs the toughness. In the case of steel plates, the addition of molybdenum in amounts up to 0.3% may be effected in relationship to the content of manganese to alleviate the temper brittleness caused by manganese. Because of the molybdenum content (less than 0.3%) in such steel plates, it is possible to add molybdenum to the welding wire in amounts up to 1%.

Nickel has the effect of improving the notch toughness of the steel. Nickel strengthens the fine structure matrix of the weld metal produced by the submerged arc process, and it is thus effective in improving the toughness. The preferred range is 0.5 to 4% and optionally 0.5 to 2.5% nickel. An increase in the nickel content above the specified maximum may tend to facilitate the precipitation of the ferrite and impair the notch toughness.

Figure 2:
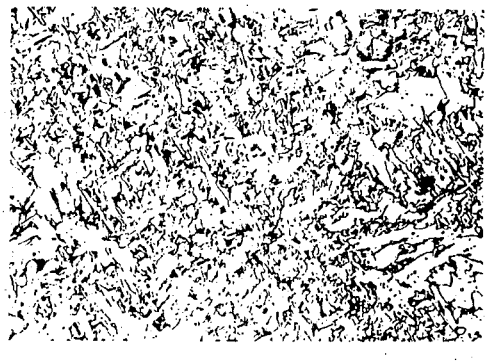
FIG. 2 is a microphotograph (magnification: 400X) showing the structure of the weld metal obtained using a welding process different from that of the present invention.
Figure 3:
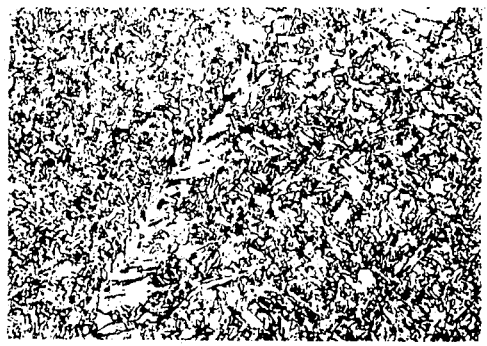

In the weld metal obtained using the aforedescribed very low-temperature steel base metal and the welding wire of this invention, the hardenability effects of manganese and boron reduce the unfavorable effects of nickel on the precipitation of the ferrite and a nickel content of 4% or lower provides a fine structure (see FIG. 3) as compared with that obtained with a low manganese content (Mn = 1.02%, FIG. 2) and the notch toughness is also improved.

The addition of nickel in amounts ranging from 1 to 4% to the very low-temperature steel is necessary to ensure the notch toughness of the steel. Further, while the welding wire need not always contain nickel owing to the dilution from the steel plates, if a welding process involving only a small dilution is employed or the base metals contain only small amounts of nickel, the welding wires must contain nickel in amounts up to 2.5% so as to improve the notch toughness of the weld metals. The term "dilution" is used to describe the distribution of elements from the steel plates to the weld metal resulting from melting and migration during and after the welding operation.

In the aforedescribed steel plate and the welding wire, the carbon content must be limited to 0.1% or lower to ensure high notch toughness, since carbon increases the strength of the weld metal and decreases the notch toughness.

Consequently, in the range of up to 0.1%, the lower the carbon content, the better the result will be. While, the steel plates may contain carbon in amounts up to 0.15% in consideration of the notch toughness of the steel plates themselves, the carbon contents should preferably be reduced as far as possible if high notch toughness is still required for the weld metal. Further, while the carbon content in the welding wire is defined in the range of 0.1% to below against the carbon content of the weld metal ranging from 0.1% to below, as with the steel plates, the carbon content should preferably be reduced further if higher notch toughness is required for the weld metal.

With the silicon content being limited to below 0.4% in the welding wire, the previously mentioned high basicity welding fluxes used in the present invention cause the deoxidization with silicon and therefore the yield in the weld metal is reduced, thereby preventing its effects on the notch toughness.

Phosphorus and sulphur are elements which reduce the notch toughness and therefore they should preferably be reduced as far as possible. Since the toughness is an important property in the steel plate, their respective amounts should be reduced to less than 0.02%. Particularly, where high notch toughness is required, both the phosphorus and sulphur contents should be reduced to the minimum. Further, where toughness is required, their contents in the welding wire should be reduced as far as possible below a maximum of 0.015% respectively.

It will thus be seen from the foregoing description that the improved submerged arc welding process provided in accordance with the present invention, by virtue of the very low-temperature steel, welding steel electrodes (welding wire) and fluxes used in unique combinations thereof as described in the examples of this invention, provide weld metal having a higher notch toughness than that which could be achieved with the conventional submerged arc welding of known very low-temperature steel. Moreover, this is achieved without sacrificing the inherent high efficiency of the submerged arc welding process.

What we claim is:

1. A submerged arc welding process for welding low-temperature steel comprising submerged arc welding
   A. adjoining steel pieces, said steel consisting essentially of up to 0.15% carbon, less than 0.4% silicon, between 1% and 2% manganese, at least one element selected from the group consisting of nickel in an amount of from 1% to 4%, molybdenum in an amount from 0.05% to 0.3%, and niobium in an amount of from 0.01% to 0.1%, and the balance being essentially iron, with
   B. a welding electrode consisting essentially of up to 0.1% carbon, less than 0.4% silicon, between 1.4% and 2.5% manganese, between 0.2% and 0.5% titanium, between 0.006% and 0.02% boron, at least one element selected from the group consisting of nickel in an amount from 0.5% to 2.5% and molybdenum in an amount of from 0.15% to 1%, and the balance being essentially iron,
   C. at least one of said steel and said electrode contains molybdenum,
   D. in the presence of a flux, to form a welded steel joint consisting of said steel pieces joined by weld metal having superior impact resistance at low temperatures, said weld metal consisting essentially of up to 0.1% carbon, less than 0.40% silicon, between 1.2% and 1.7% manganese, between 0.08% and 0.5% molybdenum, between 0.02% and 0.05% titanium, between 0.0012% and 0.004% boron, up to 4% nickel, and less than 0.045% oxygen.

2. The process of claim 1, wherein said steel contains between 1% and 4% of nickel.

3. The process of claim 2, wherein said flux is an oxide flux having a basicity value greater than 0.9, said basicity value being calculated as follows:

$$\text{basicity} = \frac{0.108}{CaO(\%)} - \frac{0.105}{SiO_2(\%)} - \frac{0.061}{TiO_2(\%)} + 0.068 \, MnO(\%) + 0.100 \, MgO(\%) - 0.002 \, Al_2O_3(\%) + 0.056 \, CaF_2(\%).$$

4. The process of claim 3, wherein said welding electrode contains between 0.5% and 2.5% nickel and wherein said weld metal contains between 0.5% and 2.5% nickel.

5. The process of claim 4, wherein said weld metal consists essentially of up to 0.1% carbon, less than 0.4% silicon, between 1.2% and 1.7% manganese, between 0.08% and 0.5% molybdenum, between 0.02% and 0.05% titanium, between 0.0012% and 0.004% boron, and less than 0.045% oxygen.

6. The process of claim 5, wherein said weld metal preferably consists essentially of up to 0.1% carbon, between 0.2% and 0.3% silicon, between 1.3% and 1.6% manganese, between 0.1% and 0.4% molybdenum, between 0.02% and 0.03% titanium, between 0.0014% and 0.0034% boron, between 0.7% and 2.2% nickel and less than 0.04% oxygen.

7. The process of claim 6, wherein said flux consists essentially of LiF, NaF, $CaF_2$, $Al_2O_3$, MgO, CaO, $SiO_2$.

8. The process of claim 5, wherein said welding electrode contains between 0.5% and 2.5% nickel and wherein said weld metal contains between 0.5% and 2.5% nickel.

9. The process of claim 2, wherein said flux is a fused flux containing a total of less than 8% $SiO_2$ and MnO, and over 45% of fluoride.

10. A welded steel joint having superior impact resistance at low temperatures consisting of at least two steel pieces joined by weld metal,
    said steel pieces consisting essentially of up to 0.15% carbon, less than 0.4% silicon, between 1% and 2% manganese, at least one element selected from the group consisting of nickel in an amount of from 1% to 4%, molybdenum in an amount from 0.05% to 0.3%, and niobium in an amount of from 0.01% to 0.1%, and the balance being essentially iron, and
    said weld metal consisting essentially of up to 0.1% carbon, less than 0.4% silicon, between 1.2% and 1.7% manganese, between 0.08% and 0.5% molybdenum, between 0.02% and 0.05% titanium, between 0.0012% and 0.004% boron, up to 4% nickel, and less than 0.045% oxygen.

11. The welded steel joint of claim 10, wherein said steel contains between 1% and 4% nickel, and wherein said weld metal contains between 0.5% and 2.5% nickel.

* * * * *

UNITED STATES PATENT OFFICE
CERTIFICATE OF CORRECTION

Patent No. 3,867,608      Dated February 18, 1975

Inventor(s) TOSHIO OHWA et al

It is certified that error appears in the above-identified patent and that said Letters Patent are hereby corrected as shown below:

IN THE SPECIFICATION:

Table 3: (at the bottom of the page under Columns 3 and 4) should have the following legend inserted under the table:

--The remainder of each steel plate is iron and incidental impurities.--

Table 4: (which comprises Columns 5 and 6) the Charpy Impact Value for Steel Plate, P-2 should be --2.18--.

IN THE CLAIMS:

Claim 3: (Column 13, lines 36 through 40) the basicity value table should appear as follows:

$$\text{basicity} = 0.108\, CaO(\%) + 0.068\, MnO(\%) + 0.100\, MgO(\%)$$
$$-0.105\, SiO_2(\%) - 0.002\, Al_2O_3(\%)$$
$$-0.061\, TiO_2(\%) + 0.056\, CaF_2(\%).$$

Signed and Sealed this ninth Day of December 1975

[SEAL]

Attest:

RUTH C. MASON
*Attesting Officer*

C. MARSHALL DANN
*Commissioner of Patents and Trademarks*